United States Patent [19]
Rajagopalan

[11] Patent Number: 6,137,274
[45] Date of Patent: Oct. 24, 2000

[54] SWITCHING DC-TO-DC CONVERTER AND CONVERSION METHOD WITH CURRENT SHARING BETWEEN PARALLELED CHANNELS

[75] Inventor: Jayendar Rajagopalan, Santa Clara, Calif.

[73] Assignee: National Semiconductor Corporation, Santa Clara, Calif.

[21] Appl. No.: 09/496,570

[22] Filed: Feb. 2, 2000

[51] Int. Cl.[7] .................................................. H02M 3/158
[52] U.S. Cl. ............................................ 323/272; 363/65
[58] Field of Search .................................... 323/265, 271, 323/272, 282, 312, 315; 363/65

[56] References Cited

U.S. PATENT DOCUMENTS

| | | | |
|---|---|---|---|
| 4,924,170 | 5/1990 | Henze ...................................... | 323/272 |
| 5,477,132 | 12/1995 | Canter et al. ............................ | 323/282 |
| 5,513,094 | 4/1996 | Stanley ..................................... | 363/98 |
| 5,724,237 | 3/1998 | Hunter ...................................... | 363/65 |
| 5,808,453 | 9/1998 | Lee et al. ................................. | 323/224 |
| 5,834,925 | 11/1998 | Chesavage .............................. | 323/272 |
| 5,847,548 | 12/1998 | He et al. .................................. | 323/222 |
| 5,861,738 | 1/1999 | Becker-Irvin et al. .................. | 323/282 |
| 5,909,108 | 6/1999 | He et al. ................................... | 323/225 |
| 5,945,815 | 8/1999 | Elliott ...................................... | 323/269 |

OTHER PUBLICATIONS

Jovanovic et al., A Novel, Low–Cost Implementation of "Democratic" Load–Current Sharing of Paralleled Converter Modules, *IEEE Transactions on Power Electronics*, vol. II, No. 4, Jul. 1996, pp. 604–611.

Ren–Hua Wu et al., Load–Current–Sharing Control for Parallel Operation to DC–to–DC Converters, IEEE Power Electronics Specialist Conference Record, 1993 pp. 101–107.

*Primary Examiner*—Adolf Deneke Berhane
*Attorney, Agent, or Firm*—Limbach & Limbach L.L.P.

[57] ABSTRACT

A DC-to-DC converter having multiple power delivery channels, and including a current-sharing switching controller implemented as an integrated circuit, multi-channel circuitry (including parallel channels connected to one output node) external to the controller chip, and current sharing circuitry (including circuitry external to the controller chip and circuitry including current mirrors internal to the controller chip), and methods for generating PWM power switch control signals for use in (and performing DC-to-DC conversion using) such a DC-to-DC converter. Preferably, the current sharing circuitry generates individual channel current signals from voltage analogs thereof produced external to the controller chip, and superposes the individual channel current signals to produce an average current signal. Channel current error signals are generated by subtracting the individual channel current signals from the average current signal. The power switch control signal for each channel is generated in response to the channel current error signal for the appropriate channel and a feedback signal (an output voltage error signal) indicative of the output potential of the DC-to-DC converter relative to a reference potential, so that the DC-to-DC converter achieves a desired output potential with increased current sharing among the channels. The invention implements current sharing between channels of a DC-to-DC converter using simple circuitry external to the controller chip (and without an external bus which connects one channel to the other), and with simple, silicon-area efficient circuitry internal to the controller chip. Preferably, current mirror circuitry in the controller chip generates a set of identical average current signals, each of which is proportional to the average of the currents drawn from the individual channels, and additional current mirror circuitry generates a set of identical error current signals, each of which is an error current proportional to the difference between the DC-to-DC converter's output potential and a reference potential.

32 Claims, 1 Drawing Sheet

SWITCHING DC-TO-DC CONVERTER AND CONVERSION METHOD WITH CURRENT SHARING BETWEEN PARALLELED CHANNELS

BACKGROUND OF THE INVENTION

1. Field of the Invention

The present invention relates to switching DC-to-DC converters having multiple power channels (either simple-paralleled or interleaved-paralleled) and configured to implement current sharing, in the sense that feedback indicative of the output current drawn from each channel is used to reduce the differences between the output currents drawn from the individual channels, thus preventing any of the channels from contributing significantly more to the combined output current than any of the other channels.

2. Description of the Related Art

For convenience, we will use the expression "switching controller" chip below to denote either a controller (implemented as an integrated circuit) which generates power switch control signals for at least one power switch implemented external to the chip (typically multiple power switches, each implemented external to the chip), or a switching "regulator" (implemented as an integrated circuit) which generates such power switch control signals and which also includes at least one power switch implemented on-board the chip (typically multiple power switches, each implemented on-board the chip). The power switches are typically MOSFET devices.

One type of conventional switching power supply circuitry which employs current-sharing control to achieve output voltage regulation is a DC-to-DC converter including a current-share switching controller chip, and circuitry (including a current sense resistor) external to the controller chip. The controller chip includes one or more channels, each channel generating a pulse width modulated power switch control signal in response to a ramped voltage and a feedback signal indicative of the DC-to-DC converter's output potential. Typically, each pulse width modulated power switch control signal is a binary signal having periodically occurring leading edges, and trailing edges which occur at times determined by the instantaneous value of the feedback signal. Typically, the ramped voltage signals for all the channels increase periodically (with the same period for all channels) at a fixed ramp rate, and their waveforms are identical (to the extent possible and practical), except that each may have a different phase than the others. In interleaved PWM DC-to-DC converters (where "PWM" denotes "pulse width modulated"), the ramped voltage signals and pulse width modulated power switch control signals are out of phase with respect to each other. In non-interleaved PWM DC-to-DC converters, the ramped voltage signals and pulse width modulated power switch control signals are in phase with respect to each other.

In power supply circuitry, it is often desired to employ multiple (parallel) channels, each channel generating a pulse width modulated power switch control signal for a different power switch. For example, in PWM DC-to-DC converters, multiple pulse width modulated power switch control signals are generated (in parallel) by providing multiple ramped voltages in parallel to comparator circuitry. The power switch control signals typically all have the same duty cycle. Often, the power switch control signals are generated in a current-share switching controller chip, and asserted to external power switch circuitry (comprising multiple power switches) to cause the latter circuitry to determine the amplitude of the DC output voltage of the DC-to-DC converter. An advantage of providing multiple channels (each channel including a power switch) rather than a single channel is that use of multiple channels allows the DC-to-DC converter to be implemented with smaller power stage inductors, smaller input filter inductors, and smaller output capacitors, thus providing an overall improved step-load transient response and reduced physical size.

However, when implementing such multi-channel, a variety of factors including process and temperature variations typically cause undesired variation from channel to channel in the output current drawn from each channel by the load (to which the output node of the DC-to-DC converter is coupled).

When implementing a current shared switching controller for a DC-to-DC converter with multiple channels, it is desirable to prevent any of the channels from contributing significantly more to the output current (the output drawn by the load at the output of the DC-to-DC converter) than any of the other channels. Preferably, the converter is implemented so that all the channels contribute equally to the output current. Current sharing between the channels (whether the paralleled power switch control signals are interleaved or non-interleaved) is essential for reliable operation and to achieve a minimum-cost system solution. As load levels increase, active feedback is required for equal distribution of current between the channels.

However, until the present invention, it was not known how to implement such current sharing using silicon-area efficient circuitry within a current mode switching controller chip (and simple circuitry external to the controller chip) while achieving a high degree of current sharing among the channels.

SUMMARY OF THE INVENTION

In a class of embodiments, the invention is a DC-to-DC converter having multiple power delivery channels, and including a current share switching controller (implemented as an integrated circuit), multi-channel circuitry (including parallel channels connected to a single output node) external to the controller chip, and current sharing circuitry (including circuitry external to the controller chip and circuitry including current mirrors internal to the controller chip). In preferred embodiments, the current sharing circuitry generates individual channel current signals (currents proportional to or otherwise indicative of the individual channel currents) from voltage analogs (produced external to the controller chip) thereof, and superposes the individual channel current signals to produce an average current signal (or multiple copies thereof). Channel current error signals are generated by subtracting the individual channel current signals from the average current signal. Optionally, the channel current error signals are amplified with a gain that is controlled by an external gain control signal applied to a pin of the controller chip. The power switch control signal for each channel is generated in response to the channel current error signal (for the appropriate channel) and a feedback signal (an output voltage error signal) indicative of the output potential of the DC-to-DC converter relative to a reference potential, so that the DC-to-DC converter achieves a desired output potential with increased current sharing among the channels (reduced differences between the currents drawn by the converter's load from the individual channels).

In accordance with the invention, current sharing is implemented between channels of a DC-to-DC converter using simple circuitry external to the controller chip (and without an external bus which connects one channel to the other), and with simple, silicon-area efficient circuitry internal to the controller chip.

In preferred embodiments, current mirror circuitry internal to the controller chip generates a set of identical average current signals (one for each channel), each of which is a "channel average current" proportional to the average of the currents drawn (by the load at the DC-to-DC converter's output) from the individual channels. Additional current mirror circuitry generates a set of identical error current signals (one for each channel), each of which is an error current proportional to the difference between the output potential of the DC-to-DC converter and a reference potential. Circuitry is also provided for generating individual channel current signals, each proportional to the current (the "individual channel current") drawn (by the load at the DC-to-DC converter's output node) from a different one of the channels. Additional current mirror circuitry generates a set of control signals (one for each channel), each having a current equal (or proportional) to the error current (itself proportional to the output voltage error) plus the difference between the channel average current and a different one of the individual channel currents. Each control signal is used to generate a PWM power switch control signal for a different one of the channels. An unique feature of this architecture is the use of current mirrors and "current-mode signal-processing" within the controller chip.

Other aspects of the invention are methods for generating PWM power switch control signals for use in a multi-channel, switching DC-to-DC converter using any embodiment of the inventive controller circuitry, and methods for performing DC-to-DC conversion with multiple power delivery channels using any embodiment of the inventive current mode switching controller chip and the inventive external circuitry coupled to the controller chip.

DETAILED DESCRIPTION OF THE PREFERRED EMBODIMENTS

Figure 1:
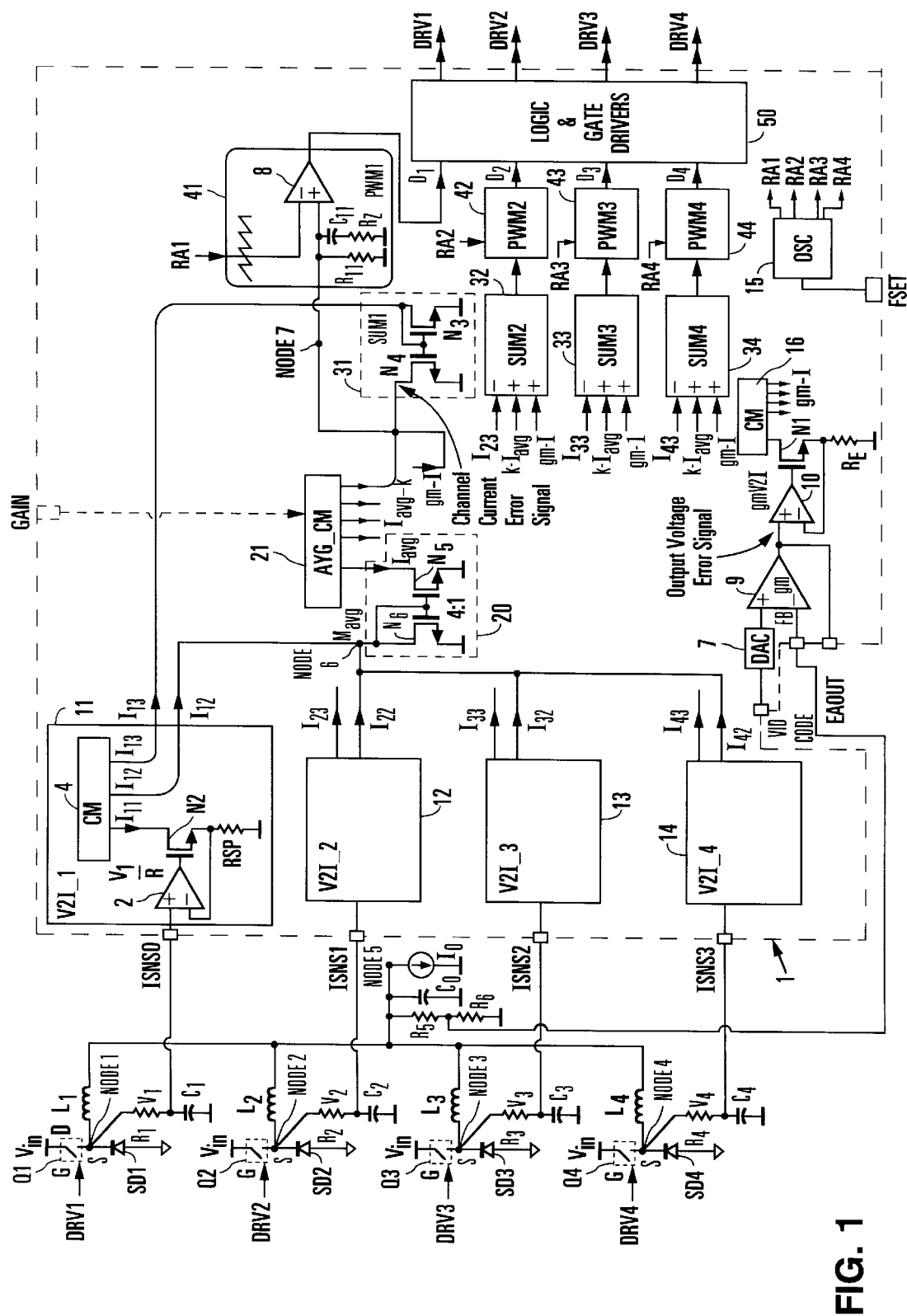
FIG. 1 is a schematic diagram of a preferred embodiment of the inventive DC-to-DC converter.

A preferred embodiment of the invention will be described with reference to FIG. 1. The DC-to-DC converter of FIG. 1 has four power delivery channels (each including a different one of power switches Q1, Q2, Q3, and Q4), and comprises current share switching controller chip 1, buck converter circuitry external to controller chip 1, and current sharing circuitry. The current sharing circuitry comprises circuitry (including resistors R1, R2, R3, and R4, and capacitors C1, C2, C3, and C4) external to controller chip 1, and circuitry (including elements 11, 12, 13, 14, 20, 21, 31, 32, 33, and 34) within controller chip 1.

The external buck converter circuitry comprises four identical portions, connected in parallel. The first portion comprises power switch Q1 which is connected between the input node (at input potential $V_{in}$) and Node 1, and is controlled by signal DRV1 from controller chip 1 (preferably switch Q1 is implemented as an NMOS transistor whose gate is coupled to receive signal DRV1); inductor L1 connected between Node 1 and the output node (Node 5); Schottky diode SD1 connected between Node 1 and ground, and resistor R1 and capacitor C1 connected in series between Node 1 and ground. The second portion comprises power switch Q2 which is connected between the input node and Node 2 and is controlled by signal DRV2 from controller chip 1 (preferably switch Q2 is implemented as an NMOS transistor whose gate is coupled to receive signal DRV2); inductor L2 connected between Node 2 and the output node; Schottky diode SD2 connected between Node 2 and ground, and resistor R2 and capacitor C2 connected in series between Node 2 and ground. The third portion comprises power switch Q3 which is connected between the input node and Node 3 and is controlled by signal DRV3 from controller chip 1 (preferably switch Q3 is implemented as an NMOS transistor whose gate is coupled to receive signal DRV3); inductor L3 connected between Node 3 and the output node; Schottky diode SD3 connected between Node 3 and ground, and resistor R3 and capacitor C3 connected in series between Node 3 and ground. The fourth portion comprises power switch Q4 which is connected between the input node and Node 4 and is controlled by signal DRV4 from controller chip 1 (preferably switch Q4 is implemented as an NMOS transistor whose gate is coupled to receive signal DRV4); inductor L4 connected between Node 4 and the output node; Schottky diode SD4 connected between Node 4 and ground, and resistor R4 and capacitor C4 connected in series between Node 4 and ground.

In embodiments in which switches Q1–Q4 are NMOS transistors, each of Nodes 1, 2, 3, and 4 is coupled to the source of a different one of the NMOS transistors, and the drains of the NMOS transistors are coupled to receive the input potential $V_{in}$.

The buck controller circuitry of FIG. 1 has conventional design, except in that, in accordance with the present invention, it includes resistors R1–R4 and capacitors C1–C4. No external current sharing bus (or other external circuitry) connects the four power distribution channels together. The node between resistor R1 and capacitor C1 is coupled to pin ISNS0 of controller chip 1, and is at potential V1 which is proportional to the current drawn from the first channel (i.e., through inductor L1) by the load coupled to the output node (Node 5). Similarly, the node between resistor R2 and capacitor C2 is coupled to pin ISNS1 of controller chip 1, and is at potential V2 which is proportional to the current drawn from the second channel (i.e., through inductor L2) by the load coupled to the output node, the node between resistor R3 and capacitor C3 is coupled to pin ISNS2 of controller chip 1, and is at potential V3 which is proportional to the current drawn from the third channel (i.e., through inductor L3) by the load coupled to the output node, and the node between resistor R4 and capacitor C4 is coupled to pin ISNS3 of controller chip 1, and is at potential V4 which is proportional to the current drawn from the fourth channel (through inductor L4) by the load coupled to the output node. Resistors R1–R4 and capacitors C1–C4 implement a non-dissipative switching voltage sense scheme, with each of pairs R1 and C1, R2 and C2, R3 and C3, and R4 and C4 implementing a low-pass RC filter which averages the potential between the resistor and capacitor. Alternatively, dissipative circuitry (external to the controller chip and typically including a sense resistor in series with inductors L1–L4 and one terminal connected to Node 5) is coupled between each channel and the corresponding one of pins ISNS0–ISNS3 to assert signals indicative of the current through each inductor L1–L4 to controller chip 1.

An output voltage feedback resistor divider, comprising resistors R5 and R6, is connected between the output node and ground, and an output capacitor $C_o$ is connected between the output node and ground. The node between resistors R5 and R6 is coupled to pin FB of controller chip 1, so that the potential at that node (which is indicative of the DC-to-DC converter's output potential at Node 5) is supplied as feedback to pin FB.

Controller chip 1 includes voltage-to current converters 11, 12, 13, and 14, coupled respectively to pins ISNS0, ISNS1, ISNS2, and ISNS3. Converters 11, 12, 13, and 14 are identical, each having two outputs at which it asserts currents proportional to the input potential at the corresponding one of pins ISNS0, ISNS1, ISNS2, and ISNS3. Specifically, currents $I_{12}$ and $I_{13}$ at the outputs of converter 11 are proportional to potential V1, currents $I_{22}$ and $I_{23}$ at the outputs of converter 12 are proportional to potential V2, currents $I_{32}$ and $I_{33}$ at the outputs of converter 13 are proportional to potential V2, and currents $I_{42}$ and $I_{43}$ at the outputs of converter 14 are proportional to potential V3.

Converter 11 includes buffer amplifier 2 (whose noninverting input is coupled to pin ISNS0), current mirror circuitry 4, resistor Rsp, NMOS transistor N2 (having a gate coupled to the output of amplifier 2, a drain coupled to current mirror 4, and a source coupled through resistor Rsp to ground). The source of transistor N2 is coupled to the inverting input of amplifier 2. The current $I_{11}$ through the channel of transistor N2 is determined by (and proportional to) the potential V1 at pin ISNS0. Current mirror 4 has two outputs, each of which asserts a current ($I_{12}$ or $I_{13}$) identical to current $I_{11}$.

The current mirror within voltage to current converter 12 has two outputs, each of which asserts a current ($I_{22}$ or $I_{23}$) proportional to the potential at pin ISNS1. The current mirror within voltage to current converter 13 has two outputs, each of which asserts a current ($I_{32}$ or $I_{33}$) proportional to the potential at pin ISNS2. The current mirror within voltage to current converter 14 has two outputs, each of which asserts a current ($I_{42}$ or $I_{43}$) proportional to the potential at pin ISNS3.

Currents $I_{12}$, $I_{22}$, $I_{32}$, and $I_{42}$ flow to Node 6, and thus the current through the channel of transistor N6 (within current mirror 20) is equal to ($I_{12}+I_{22}+I_{32}+I_{42}$). Current mirror 20 includes NMOS transistors N5 and N6 connected as shown. The channels of transistors N5 and N6 have length to width ratios such that the current through the channel of N5 is $I_{avg}=k_1(I_{12}+I_{22}+I_{32}+I_{42})$, where $k_1$ is a constant determined by the ratio of the width to length ratio of transistor N5's channel to the width to length ratio of transistor N6's channel. Current $I_{avg}$ is proportional to the average of the currents drawn from the four channels of the DC-to-DC converter. Preferably $k_1=\frac{1}{4}$.

Current mirror circuitry 21, coupled to current mirror 20 as shown, is configured to assert four identical currents $k(I_{avg})$ in parallel, in response to current $I_{avg}$, where k is a constant determined by the characteristics of the components of current mirror circuitry 21.

In alternative embodiments, current mirror circuitry 21 is configured so that the parameter k is variable in response to an external control signal (e.g., a signal applied to a pin labeled "Gain", indicated in phantom view, and supplied from the pin labeled "Gain" to circuitry 21). Thus, a desired value of parameter k is determined by an external control signal applied (from external circuitry) to a pin of controller chip 1, and from such pin to circuitry 21, and each current signal $k(I_{avg})$ is effectively amplified with a gain that is controlled by the external gain control signal.

As mentioned, pin FB of controller chip 1 is at a potential indicative of the DC-to-DC converter's output potential (the potential at Node 5). The inverting input of error amplifier 9 is coupled to pin FB. The noninverting input of error amplifier 9 is coupled to the output of digital-to-analog converter 7 ("DAC" 7). The input of DAC 7 is coupled to pins which receive binary control bits "VID CODE" (supplied from an external unit) which determine a reference potential $V_{ref}$. In response to the control bits VID CODE, DAC 7 asserts reference potential $V_{ref}$ to the non-inverting input of error amplifier 9. The output of error amplifier 9 (which is asserted both to pin "EAOUT" and to the noninverting input of error amplifier 10) is a potential indicative of the difference between the potential at Node 5 (the output potential of the DC-to-DC converter) and the reference potential $V_{ref}$.

Reference potential $V_{ref}$ is normally not varied during use of the circuit. In order to set (or vary) the regulated level of the output potential at Node 5, resistors R5 and R6 with the appropriate resistance ratio R5/R6 are employed.

The inverting input of error amplifier 10 is coupled to the source of NMOS transistor N1, the output of error amplifier 10 is coupled to the gate of NMOS transistor N1, and the source of transistor N1 is coupled through resistor $R_E$ to ground. The drain of transistor N1 is coupled to current mirror circuitry 16. The current through transistor N1 (denoted "$g_mI$") is determined by the difference between the output potential of amplifier 9 and the voltage across resistor $R_E$, and is thus linearly related to the difference between the reference potential $V_{ref}$ and the output potential of the DC-to-DC converter (at Node 5). Thus, if the output potential of the DC-to-DC converter is at the reference potential $V_{ref}$, the current $g_mI$ has a first value, and if the output potential of the DC-to-DC converter then decreases below the reference potential $V_{ref}$, the current $g_mI$ increases to a level above the first value.

Current mirror circuitry 16, coupled to transistor N1 as shown, is configured to assert four parallel, identical currents $g_mI$, each identical to the current through the channel of transistor N1. Each of these currents is asserted to the input node of a different one of current mirror circuits 31, 32, 33, and 34. Circuits 31, 32, 33, and 34 are identical to each other, and each includes two NMOS transistors identical to transistors N3 and N4 (connected as shown within the block labeled 31). The drain and gate of N3, and the gate of N4 are at the same potential, and current $I_{13}$ flows through the channel of N3. Thus, the current through the channel of N4 is equal to current $I_{13}$. The drain of N4 (Node 7) is coupled to an output of circuit 21, and output of circuit 16, and to an input of circuit 41 (to the noninverting input of comparator 8 within circuit 41). Thus, the current flowing from Node 7 to circuit 41 is equal to $g_mI+k(I_{avg})-I_{13}$.

Similarly, the current flowing from circuit 32 to circuit 42 is equal to equal to $g_mI+k(I_{avg})-I_{23}$, the current flowing from circuit 33 to circuit 43 is equal to equal to current $g_mI+k(I_{avg})-I_{33}$, and the current flowing from circuit 34 to circuit 44 is equal to equal to current $g_mI+k(I_{avg})-I_{43}$.

Controller chip 1 also includes oscillator 15 which generates ramped voltage signals RA1, RA2, RA3, and RA4. All of signals RA1–14 RA4 have the same frequency (determined by externally supplied control signal FSET), but are out of phase with respect to each other. Typically, RA4 is 90 degrees out of phase with respect to RA3, RA3 is 90 degrees out of phase with respect to RA2, RA2 is 90 degrees out of phase with respect to RA1, and RA1 is 90 degrees out of phase with respect to RA4. Each ramped voltage RA1, RA2, RA3, and RA4 periodically increases at a fixed ramp rate and then decreases, with a waveform as indicated.

Circuits 41, 42, 43, and 44 are identical, each comprising a comparator (identical to comparator 8 of circuit 41) whose inverting input is coupled to receive a different one of ramped voltage signals RA1, RA2, RA3, and RA4 (circuit 41 receives RA1, circuit 42 receives RA2, circuit 43 receives RA3, and circuit 44 receives RA4), a resistor $R_{11}$ connected between ground and the comparator's noninverting input, and a capacitor $C_{11}$ and resistor $R_{12}$ connected between ground and the comparator's noninverting input (in parallel with resistor $R_{11}$). These resistor-capacitor circuits connected between the noninverting input and ground convert the current signal to a voltage and also provide frequency dependent gain.

Comparator 8 within circuit 41 produces "reset" pulse train D1 in response to a comparison of ramped voltage RA1 with the feedback potential at Node 7 (which is indicative of the current $g_m I+k(I_{avg})-I_{13}$). In response to the leading edge of each pulse of pulse train D1, a latch within logic (and gate driver generation) circuit 50 is reset to cause the power switch control signal DRV1 to undergo a transition to a level which turns off switch Q1.

Oscillator 15 also asserts four periodic "set" pulse trains (each in phase with one of ramped voltage signals RA1, RA2, RA3, and RA4) to latch circuitry within circuit 50. One latch for each channel is set (in response to each "set" pulse of each such pulse train, and is reset by each "reset" pulse of the corresponding one of "reset" pulse trains D1, D2, D3, and D4. Each time the latch for the first channel is set, the power switch control signal DRV1 undergoes a transition to a level which turns on switch Q1. Thus, although switch Q1 turns on at times in phase with the periodic "set" pulse train, it turns off at times (determined by "reset" pulse train D1) that have arbitrary phase relative to the pulses of the periodic "set" pulse train.

In the same way, the comparator within each of circuits 42, 43, and 44 produces one of "reset" pulse trains D2, D3, and D4 in response to a comparison of the corresponding one of ramped voltages RA2, RA3, and RA4 with a feedback potential indicative of the corresponding one of currents $g_m I+k(I_{avg})-I_{23}$, $g_m I+k(I_{avg})-I_{33}$, and $g_m I+k(I_{avg})-I_{43}$. In response to the leading edge of each pulse of pulse train D2, a latch within circuit 50 is reset to cause the power switch control signal DRV2 to undergo a transition to a level which turns off switch Q2. In response to the leading edge of each pulse of pulse train D3, a latch within circuit 50 is reset to cause the power switch control signal DRV3 to undergo a transition to a level which turns off switch Q3. In response to the leading edge of each pulse of pulse train D4, a latch within circuit 50 is reset to cause the power switch control signal DRV4 to undergo a transition to a level which turns off switch Q4.

Pulse width modulated power switch control signals DRV1, DRV2, DRV3, and DRV4 (asserted at the output of logic and gate driver generation circuit 50) respectively turn power switches (transistors) Q1, Q2, Q3, and Q4 on and off with a controlled duty cycle. Each of switches Q1, Q2, Q3, and Q4 turns on at times in phase with a periodic "set" pulse train, and turns off at times (determined by the corresponding one of "reset" pulse trains D1, D2, D3, and D4) that have arbitrary phase relative to the pulses of the periodic "set" pulse train.

Circuit 50 can include logic circuitry for causing controller 1 to operate in desired ones of multiple operating modes. For example, it can be implemented with soft start circuitry which overrides the previously described circuitry for generating signals DRV1, DRV2, DRV3, and DRV4 in a soft start mode. In another class of examples, it can include circuitry for implementing an operating mode in which only a subset of switches Q1, Q2, Q3, and Q4 is used. As an example of the latter embodiment, the FIG. 1 circuit may operate in a mode in which only switches Q1, Q2, and Q3 are used, with oscillator 15 generating only signals RA1, RA2, and RA3 (each 120 degrees out of phase with respect to each other) and three periodic "set" pulse trains (each in phase with one of signals RA1, RA2, and RA3), and circuits 14, 34, and 44 being disabled.

We sometimes use the term "channel" to refer to the circuitry for generating one of the signal pairs D1 and DRV1, D2 and DRV2, D3 and DRV3, and D4 and DRV4, and providing a corresponding contribution to the current drawn from the output node (Node 5), so that the FIG. 1 circuit includes four channels (one channel comprising elements 11, 31, 41, Q1, and L1; another channel comprising 12, 32, 42, Q2, and L2; a third channel comprising 13, 33, 43, Q3, and L3; and a fourth channel comprising 14, 34, 44, Q4, and L4). The portion of each channel of circuitry that is external to the controller (e.g., elements Q1, SD1, L1, R5, R6, and $C_o$ of FIG. 1, but not elements 11, 31, and 41 of FIG. 1) is sometimes also referred to as a "channel" (or a "power delivery channel"). The sets of control signals themselves are sometimes also referred to as "channels" of control signals.

The control technique of the invention comprises the steps of: sensing the individual channel currents drawn from the output node of a DC-to-DC converter (e.g., the currents drawn from Node 1, Node 2, Node 3, and Node 4 of FIG. 1), generating a signal indicative of the average of the individual channel currents, generating individual channel error signals indicative of the error in each individual channel current relative to its desired theoretical value (determining the difference between each individual channel current and the average of the channel currents), and modifying a general feedback signal (a feedback signal indicative of the difference between the DC-to-DC converter's output potential and the desired output potential) with each of the individual channel error signals to determine the duty cycle for the power switch of each channel.

Although only a preferred embodiment has been described in detail herein, those having ordinary skill in the art will certainly understand that many modifications and variations thereon are possible without departing from the teachings hereof. For example, a wide variety of DC-to-DC converters which employ circuitry, other than buck converter circuitry, external to a current mode switching controller can be implemented in accordance with the invention (in one class of such DC-to-DC converters, boost converter circuitry external to a current mode switching controller chip is employed, the boost converter circuitry provides voltage signals indicative of the individual channel currents to the controller chip, and the controller chip is implemented in accordance with the invention). All such modifications and variations are intended to be encompassed within the following claims.

What is claimed is:

1. A DC-to-DC converter having an input node for receiving an input potential, and an output node at which the converter asserts an output potential, wherein when a load is coupled to the output node, the load draws an output current from said output node, wherein the converter comprises:

current sharing circuitry;

a switching controller configured to generate at least two pulse width modulated power switch control signals, and having at least one reference input coupled to receive at least one signal indicative of a reference potential;

multiple power delivery channels connected in parallel between the input node and the output node, each of the power delivery channels including a power switch coupled to the controller for receiving a different one of the pulse width modulated power switch control signals; and feedback circuitry, coupled between the output node and a feedback input of the controller, and configured to assert to the feedback input a feedback signal indicative of the output potential, wherein the current sharing circuitry includes first current sharing circuitry coupled between the power delivery channels and a first set of input nodes of the controller, and second current sharing circuitry which is a portion of the controller and is coupled to the first set of input nodes, wherein the first current sharing circuitry is configured to assert channel feedback signals to the first set of input nodes, said channel feedback signals being indicative of channel portions of the output current, wherein each of the channel portions is that portion of the output current drawn from a different one of the power delivery channels, the second current sharing circuitry is configured to generate channel current error signals in response to the channel feedback signals, and the channel current error signals are indicative of the difference between an average of the channel portions and a different one of the channel portions, wherein the controller is configured to generate the power switch control signals in response to the channel current error signals and at least one output error signal indicative of the difference between the output potential and the reference potential, whereby the power switch control signals cause the converter to assert the output potential with reduced differences among the channel portions of the output current.

2. The DC-to-DC converter of claim 1, wherein the channel feedback signals are voltage signals and the second current sharing circuitry comprises:

a set of voltage-to-current converters, each having an input coupled to a different one of the first set of input nodes, configured to generate channel current signals indicative of the individual channel portions in response to the channel feedback signals;

current mirror circuitry coupled to the voltage-to-current converters to receive a first subset of the channel current signals and configured to produce average current signals in response to the first subset of the channel current signals, wherein each of the average current signals is indicative of the average of the channel portions; and additional current mirror circuitry coupled to receive the average current signals and a second subset of the channel current signals and configured to generate the channel current error signals in response thereto.

3. The DC-to-DC converter of claim 2, wherein each of the voltage-to-current converters has a first output coupled to the current mirror circuitry and a second output coupled to the additional current mirror circuitry, each of the first subset of the channel current signals is asserted at the first output of one of the voltage-to-current converters and each of the second subset of the channel current signals is asserted at the second output of one of the voltage-to-current converters.

4. The DC-to-DC converter of claim 2, wherein the current mirror circuitry comprises:

a first current mirror which generates a first current proportional to a sum of the channel current signals in the first subset; and second current mirror circuitry, coupled to the first current mirror, and configured to produce the average current signals in response to the first current.

5. The DC-to-DC converter of claim 2, wherein the controller also includes:

oscillator circuitry configured to generate a set of ramped voltage signals; and comparator circuits, each having a first input coupled to receive a different one of the channel current error signals and a comparator having an input coupled to receive a different one of the ramped voltage signals, wherein the comparator circuits have outputs at which they assert pulse width modulated signals, wherein each of the comparator circuits is configured to generate a different one of the pulse width modulated signals in response to comparison of the potential at its first input with the potential at the input of the comparator thereof.

6. The DC-to-DC converter of claim 5, wherein the at least one output error signal is a set of error currents each indicative of the difference between the output potential and the reference potential, and the controller also comprises:

output error signal circuitry, coupled to the feedback input and the at least one reference input, and configured to generate the set of error currents in response to the feedback signal and the reference potential; and wherein the additional current mirror circuitry comprises a set of current mirror circuits, each of said current mirror circuits comprising:

a first MOSFET device having a gate and a channel; and a second MOSFET device having a gate coupled to the gate of the first MOSFET device, and a channel through which a channel current flows, wherein the channel current in the second MOSFET device of each of the current mirror circuits of the additional current mirror circuitry is equal to a different one of the channel current signals, and the first MOSFET device of each of the current mirror circuits of the additional current mirror circuitry is coupled to the output error signal circuitry and the current mirror circuitry such that a portion of the sum of one of the error currents and one of the average current signals flows through the channel thereof.

7. The DC-to-DC converter of claim 6, wherein said portion of the sum of one of the error currents and one of the average current signals flowing through the channel of the first MOSFET device of said each of the current mirror circuits of the additional current mirror circuitry is equal to said different one of the channel current signals flowing through the channel of the second MOSFET device of said each of the current mirror circuits of the additional current mirror circuitry.

8. The DC-to-DC converter of claim 5, wherein the controller also comprises:

logic and gate driver circuitry coupled to the comparator circuits to receive the pulse width modulated signals, and configured to generate the pulse width modulated power switch control signals in response to said pulse width modulated signals.

9. The DC-to-DC converter of claim 1, wherein the controller is configured so that each of the channel current error signals is proportional to said difference between the average of the channel portions and said different one of the channel portions with a proportionality constant determined by an external control signal applied to the controller.

10. The DC-to-DC converter of claim 1, wherein said switching controller is implemented as an integrated circuit, and the feedback circuitry and the first current sharing circuitry are external to said integrated circuit.

11. The DC-to-DC converter of claim 1, wherein said switching controller is implemented as a portion of an integrated circuit.

12. A switching controller for use in a DC-to-DC converter, having an input node for receiving an input potential and an output node at which the converter asserts an output potential, and configured so that when a load is coupled to the output node, the load draws an output current from said output node, wherein the switching controller is configured to generate at least two pulse width modulated power switch control signals and has a feedback input, said DC-to-DC converter having multiple power delivery channels each including a power switch coupled to the controller for receiving a different one of the pulse width modulated power switch control signals, and feedback circuitry configured to assert to the feedback input of the controller a feedback signal indicative of the output potential, said DC-to-DC converter also having circuitry configured to produce channel feedback signals indicative of channel portions of the output current, each of the channel portions being a portion of the output current drawn from a different one of the power delivery channels, said controller comprising:

current sharing circuitry including a first set of input nodes for receiving the channel feedback signals, and circuitry coupled to the first set of input nodes and configured to generate at least one average current error signal and at least two channel current error signals in response to the channel feedback signals, wherein each said average current signal is indicative of an average of the channel portions, and each of the channel current error signals is indicative of the difference between the average of the channel portions and a different one of the reference portions; and control signal generating circuitry including at least one input coupled to receive at least one signal indicative of a reference potential, the control signal generating circuitry being configured to generate at least one output error signal indicative of the difference between the output potential and the reference potential and to generate the power switch control signals in response to the channel current error signals and said at least one output error signal, whereby the power switch control signals cause the DC-to-DC converter to assert the output potential with reduced differences among the channel portions of the output current.

13. The controller of claim 12, wherein the channel feedback signals are voltage signals, the at least one average current error signal is a set of average current error signals, and the current sharing circuitry comprises:

a set of voltage-to-current converters, each having an input coupled to a different one of the first set of input nodes, configured to generate channel current signals indicative of the individual channel portions in response to the channel feedback signals;

current mirror circuitry coupled to receive a first subset of the channel current signals and configured to produce the average current signals in response to the first subset of the channel current signals; and additional current mirror circuitry coupled to receive the average current signals and a second subset of the channel current signals and configured to generate the channel current error signals in response thereto.

14. The controller of claim 13, wherein each of the voltage-to-current converters has a first output coupled to the current mirror circuitry and a second output coupled to the additional current mirror circuitry, each of the first subset of the channel current signals is asserted at the first output of one of the voltage-to-current converters and each of the second subset of the channel current signals is asserted at the second output of one of the voltage-to-current converters.

15. The controller of claim 13, wherein the current mirror circuitry comprises:

a first current mirror which generates a first current proportional to a sum of the channel current signals in the first subset; and second current mirror circuitry, coupled to the first current mirror, and configured to produce the average current signals in response to the first current.

16. The controller of claim 13, also including:

oscillator circuitry configured to generate a set of ramped voltage signals, and wherein the control signal generating circuitry includes comparator circuits, each having a first input coupled to receive a different one of the channel current error signals and a comparator having an input coupled to receive a different one of the ramped voltage signals, wherein the comparator circuits have outputs at which they assert pulse width modulated signals, wherein each of the comparator circuits is configured to generate a different one of the pulse width modulated signals in response to comparison of the potential at its first input with the potential at the input of the comparator thereof.

17. The controller of claim 16, wherein the at least one output error signal is a set of error currents each indicative of the difference between the output potential and the reference potential, and wherein the control signal generating circuitry also comprises output error signal circuitry, coupled to the feedback input and the at least one reference input, and configured to generate the set of error currents in response to the feedback signal and the reference potential, and wherein the additional current mirror circuitry comprises a set of current mirror circuits, each of said current mirror circuits comprising:

a first MOSFET device having a gate and a channel; and a second MOSFET device having a gate coupled to the gate of the first MOSFET device, and a channel through which a channel current flows, the channel current in the second MOSFET device of each of the current mirror circuits of the additional current mirror circuitry being equal to a different one of the channel current signals, wherein the first MOSFET device of each of the current mirror circuits of the additional current mirror circuitry is coupled to the output error signal circuitry and the current mirror circuitry such that a portion of the sum of one of the error currents and one of the average current signals flows through the channel thereof.

18. The controller of claim 17, wherein said portion of the sum of one of the error currents and one of the average current signals flowing through the channel of the first MOSFET device of each of the current mirror circuits of the additional current mirror circuitry is equal to said different one of the channel current signals flowing through the channel of the second MOSFET device of said each of the current mirror circuits of the additional current mirror circuitry.

19. The controller of claim 16, wherein the control signal generating circuitry also comprises:
  logic and gate driver circuitry coupled to the comparator circuits to receive the pulse width modulated signals, and configured to generate the pulse width modulated power switch control signals in response to said pulse width modulated signals.

20. The controller of claim 12, wherein the current sharing circuitry is configured so that each of the channel current error signals is proportional to said difference between the average of the channel portions and said different one of the channel portions with a proportionality constant determined by an external control signal applied to said current sharing circuitry.

21. The controller of claim 12, wherein said switching controller is implemented as an integrated circuit.

22. The controller of claim 12, wherein said switching controller is implemented as a portion of an integrated circuit.

23. A method for generating pulse width modulated power switch control signals for use in a DC-to-DC converter which asserts an output potential at an output node in response to an input signal and the pulse width modulated power switch control signals, wherein the DC-to-DC converter is configured so that when a load is coupled to the output node, the load draws an output current from said output node, and the DC-to-DC converter has multiple power delivery channels each including a power switch coupled for receiving a different one of the pulse width modulated power switch control signals, said method comprising the steps of:
  (a) generating at least one average current error signal and at least two channel current error signals in response to channel feedback signals, wherein the channel feedback signals are indicative of channel portions of the output current, each of the channel portions being a portion of the output current drawn from a different one of the power delivery channels, wherein each said average current signal is indicative of an average of the channel portions, and each of the channel current error signals is indicative of the difference between the average of the channel portions and a different one of the reference portions;
  (b) generating at least one output error signal indicative of the difference between the output potential and a reference potential; and
  (c) generating the power switch control signals in response to the channel current error signals and said at least one output error signal, whereby the power switch control signals are useful to cause the DC-to-DC converter to assert the output potential with reduced differences among the channel portions of the output current.

24. The method of claim 23, wherein the channel feedback signals are voltage signals, the at least one average current error signal is a set of average current error signals, and step (a) includes the steps of:
  (d) generating channel current signals indicative of the individual channel portions in response to the channel feedback signals;
  (e) employing current mirror circuitry to produce the average current signals in response to a first subset of the channel current signals; and
  (f) employing additional current mirror circuitry to generate the channel current error signals in response to the average current error signals and a second subset of the channel current signals.

25. The method of claim 24, wherein step (e) includes the steps of:
  employing a first current mirror to generate a first current proportional to a sum of the channel current signals in the first subset; and
  employing second current mirror circuitry to produce the average current signals in response to the first current.

26. The method of claim 23, wherein step (c) includes the steps of:
  generating a set of ramped voltage signals;
  producing a set of error voltages, each proportional to the sum of the difference between the output potential and the reference potential and a voltage proportional to the difference between said average current error signal and a different one of the channel current error signals; and
  generating pulse width modulated signals, each in response to comparison of a different one of the ramped voltage signals with a different one of the error voltages.

27. The method of claim 26, also including the step of:
  employing logic and gate driver circuitry to generate the pulse width modulated power switch control signals in response to said pulse width modulated signals.

28. A method for performing DC-to-DC conversion using a DC-to-DC converter, having multiple power delivery channels connected in parallel between and input node and an output node, each of the channels including a power switch configured to operate under control of a different one of a set of pulse width modulated power switch control signals, to assert an output potential at the output node in response to an input signal at the input node and said set of pulse width modulated power switch control signals, while a load coupled to the output node draws an output current from said output node, said method comprising the steps of:
  (a) generating at least one average current error signal and at least two channel current error signals in response to channel feedback signals, wherein the channel feedback signals are indicative of channel portions of the output current, each of the channel portions being a portion of the output current drawn from a different one of the power delivery channels, wherein each said average current signal is indicative of an average of the channel portions, and each of the channel current error signals is indicative of the difference between the average of the channel portions and a different one of the reference portions;
  (b) generating at least one output error signal indicative of the difference between the output potential and a reference potential; and
  (c) generating the power switch control signals in response to the channel current error signals and said at least one output error signal, whereby the power switch control signals are useful to cause the DC-to-DC converter to assert the output potential with reduced differences among the channel portions of the output current.

29. The method of claim 28, wherein the channel feedback signals are voltage signals, the at least one average current error signal is a set of average current error signals, and step (a) includes the steps of:
  (d) generating channel current signals indicative of the individual channel portions in response to the channel feedback signals;
  (e) employing current mirror circuitry to produce the average current signals in response to a first subset of the channel current signals; and (f) employing additional current mirror circuitry to generate the channel current error signals in response to the average current error signals and a second subset of the channel current signals.

30. The method of claim 29, wherein step (e) includes the steps of:

employing a first current mirror to generate a first current proportional to a sum of the channel current signals in the first subset; and employing second current mirror circuitry to produce the average current signals in response to the first current.

31. The method of claim 28, wherein step (c) includes the steps of:

generating a set of ramped voltage signals;

producing a set of error voltages, each proportional to the sum of the difference between the output potential and the reference potential and a voltage proportional to the difference between said average current error signal and a different one of the channel current error signals; and generating pulse width modulated signals, each in response to comparison of a different one of the ramped voltage signals with a different one of the error voltages.

32. The method of claim 31, also including the step of:

employing logic and gate driver circuitry to generate the pulse width modulated power switch control signals in response to said pulse width modulated signals.

* * * * *